(12) United States Patent
Kim

(10) Patent No.: US 10,885,943 B1
(45) Date of Patent: Jan. 5, 2021

(54) MULTIMEDIA AUTHORING APPARATUS WITH SYNCHRONIZED MOTION AND VOICE FEATURE AND METHOD FOR THE SAME

(71) Applicant: Artificial Intelligence Research Institute, Seongnam-si (KR)

(72) Inventor: Dae Seoung Kim, Seoul (KR)

(73) Assignee: ARTIFICIAL INTELLIGENCE RESEARCH INSTITUTE, Seongam-si (KR)

(*) Notice: Subject to any disclaimer, the term of this patent is extended or adjusted under 35 U.S.C. 154(b) by 0 days.

(21) Appl. No.: 16/703,857

(22) Filed: Dec. 4, 2019

(30) Foreign Application Priority Data

Nov. 18, 2019 (KR) .................. 10-2019-0147624

(51) Int. Cl.
| | | |
|---|---|---|
| *G11B 27/34* | (2006.01) | |
| *G11B 27/28* | (2006.01) | |
| *G10L 15/05* | (2013.01) | |
| *G11B 27/036* | (2006.01) | |

(52) U.S. Cl.
CPC .............. *G11B 27/28* (2013.01); *G10L 15/05* (2013.01); *G11B 27/036* (2013.01); *G11B 27/34* (2013.01)

(58) Field of Classification Search
None
See application file for complete search history.

(56) References Cited

U.S. PATENT DOCUMENTS

| | | | |
|---|---|---|---|
| 5,613,909 A | 3/1997 | Stelovsky | |
| 5,970,459 A | 10/1999 | Yang et al. | |
| 6,204,840 B1 | 3/2001 | Petelycky et al. | |
| 10,038,153 B2 | 7/2018 | Che et al. | |
| 2010/0281375 A1* | 11/2010 | Pendergast ............. | G11B 27/34 715/723 |
| 2014/0039871 A1* | 2/2014 | Crawford .............. | G06F 40/103 704/2 |

FOREIGN PATENT DOCUMENTS

| | | |
|---|---|---|
| KR | 10-0236974 B1 | 10/1999 |
| KR | 10-2002-0023717 A | 3/2002 |
| KR | 10-2006-0031449 A | 4/2006 |
| KR | 10-1856192 B1 | 5/2018 |
| KR | 10-2019-0110566 A | 9/2019 |

OTHER PUBLICATIONS

Korean office action dated Jul. 17, 2020 from Korean Intellectual Property Office for Korean Application No. 10-2019-0147624.

* cited by examiner

*Primary Examiner* — Eileen M Adams

(57) ABSTRACT

Disclosed is a technique for a multimedia authoring tool embodied in a computer program. A voice clip is displayed on a timeline, and a playback time point for each syllable and pronunciation information of the corresponding syllable are also displayed. Also, a motion clip may be edited in synchronization with the voice clip on the basis of the playback time point for each syllable. By moving a syllable of the voice clip along the timeline, a portion of the voice clip may be altered.

10 Claims, 7 Drawing Sheets

MULTIMEDIA AUTHORING APPARATUS WITH SYNCHRONIZED MOTION AND VOICE FEATURE AND METHOD FOR THE SAME

CROSS-REFERENCE TO RELATED APPLICATION(S)

This application claims priority from Korean Patent Application No. 10-2019-0147624, filed on Nov. 18, 2019, in the Korean Intellectual Property Office, the disclosure of which is incorporated herein by reference in its entirety.

BACKGROUND

1. Field

The following description relates to a technique for a multimedia authoring tool embodied in computer graphics, in particular, in a computer program.

2. Description of Related Art

Multimedia content including voice and motion is an input of a multimedia player. A multimedia player directs motion by referring to visual information included in a motion clip, for example, by controlling the movement of an avatar modeled in three dimensions while playing back a voice clip. The motion clip displays, as the movement or coordinates of a vector, visual positions or movements of body parts that are divided from one another on the basis of an avatar's joints, and is configured to include visual information and position information.

To direct an avatar's operation more realistically, delicate synchronization between voice and motion is required. U.S. Pat. No. 6,204,840 issued on Mar. 20, 2001, discloses a technique for producing a multimedia file by dragging multimedia data segments on a storyline strip. However, this related art cannot implement syllable-level synchronization between video and voice.

As disclosed in Korean Patent No. 236,974, which is registered on Oct. 5, 1999, techniques for playing back voice in synchronization with lip movement included in a video signal in a text-to-speech conversion system (TTS) are known. Such a technique has an approach to control the synthesis of synthesized sound by using movement time information and duration information for lips in an image. Such video-driven voice synchronization causes unnatural voice playback and has a limitation in that the voice synchronization cannot be applied to voice clips that have been already made.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a multimedia authoring technique capable of playing back motion and voice in natural synchronization with each other.

The following description also relates to a user interface capable of easily performing synchronized authoring on motion and voice.

The following description also relates to a multimedia authoring technique capable of naturally playing back voice in synchronization with motion.

In one general aspect, a voice clip being edited on a timeline is displayed, and a playback time point is displayed on a syllable basis.

In an additional aspect, a motion clip may be edited in synchronization with a voice clip on the basis of a playback time point for each syllable.

In an additional aspect, a syllable-specific playback time point may be automatically extracted through voice recognition on a voice clip.

In an additional aspect, by moving a syllable of a voice clip along a timeline, a portion of the voice clip may be altered. By performing alteration on a syllable basis according to motion, natural directing may be possible.

Other features and aspects will be apparent from the following detailed description, the drawings, and the claims.

Figure 1:
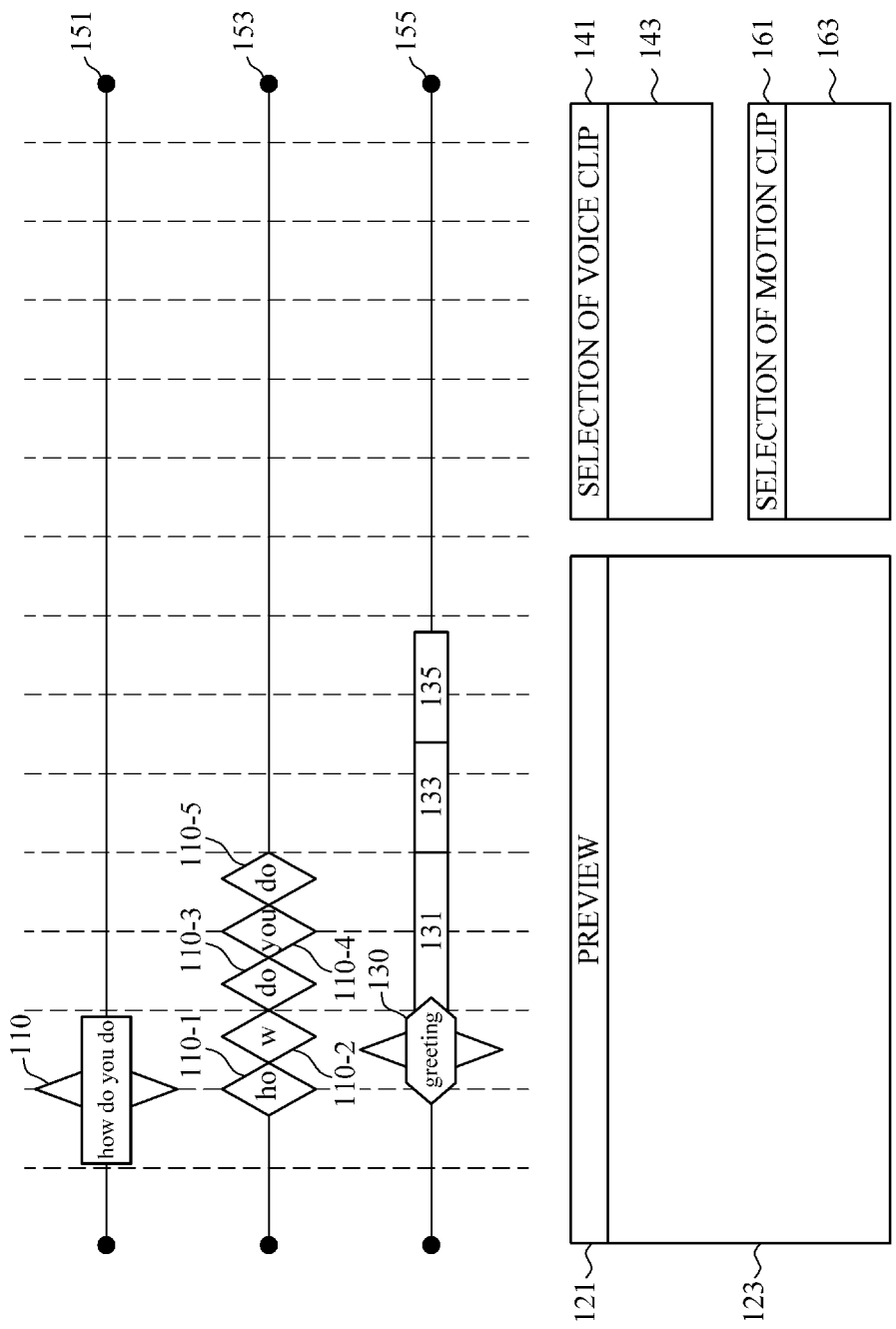
FIGS. 1 and 2 are diagrams schematically illustrating a user interface according to an embodiment of the proposed invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The above and other aspects will be implemented through embodiments described with reference to the accompanying drawings. It is to be understood that the components of each embodiment may be variously combined therein unless otherwise stated or mutually contradictory.

Figure 2:
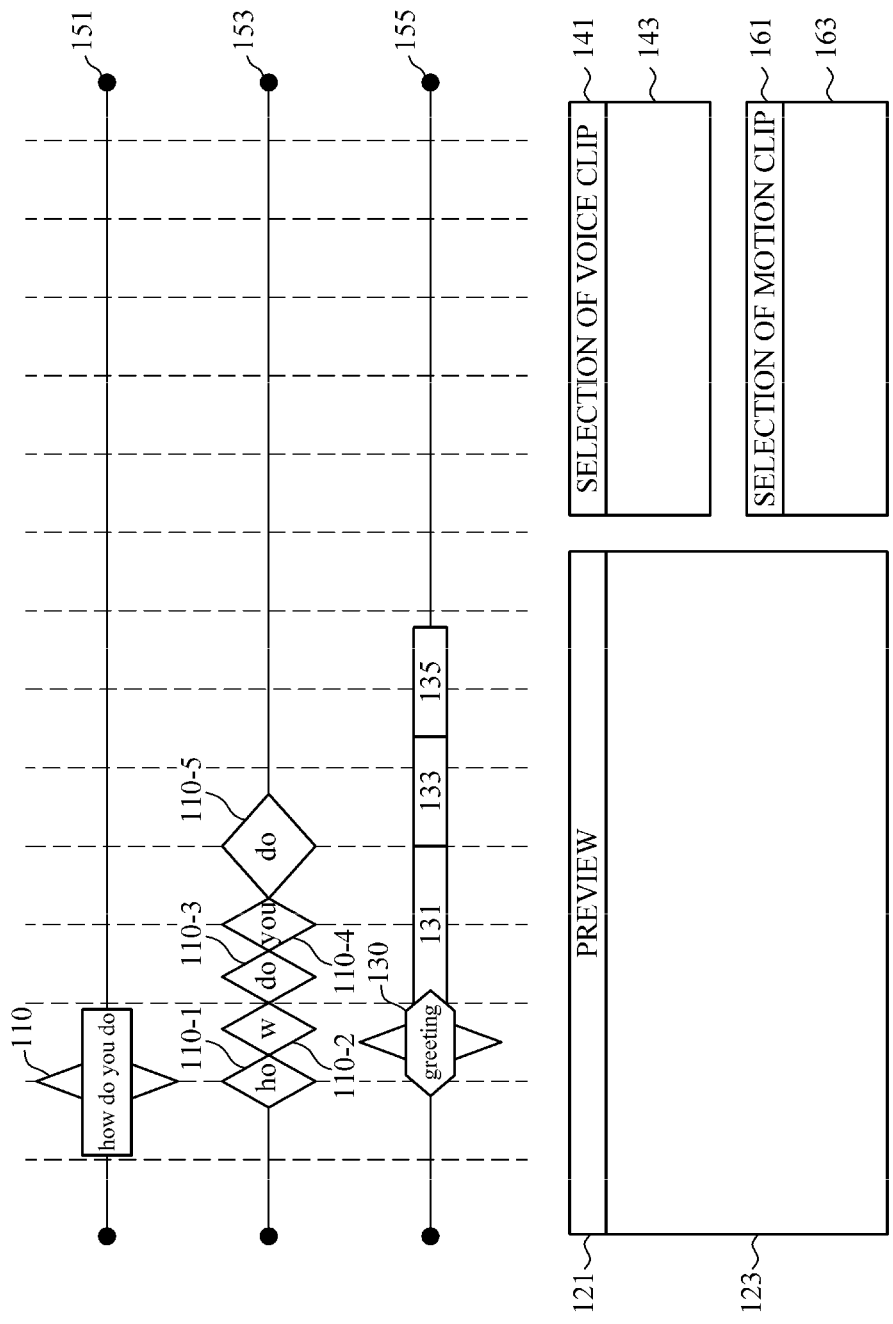

FIGS. 1 and 2 are diagrams schematically illustrating a user interface according to an embodiment of the proposed invention. An example shown in FIG. 1 is merely illustrative and is intended to aid the understanding of the proposed invention and is to be understood as a description of specific functions described in the appended claims and not as a limitation on the configuration.

As shown, an output screen of a user interface according to an embodiment may include timelines 151, 153, and 155 for each receiving a voice clip and a motion clip, voice clip selection menus 141 and 143 for each retrieving or extracting a voice clip from a voice clip database, motion clip selection menus 161 and 163 for each retrieving or extracting a motion clip from a motion clip database, and preview menus 121 and 123 for each playing back and outputting a section part selected by a user from multimedia content being edited on a timeline. The timeline includes a timeline 151 for receiving a voice clip icon 110, a timeline 153 for outputting syllable indication icons 110-1, . . . , 110-5 indicating playback time points of syllables included in the voice clip 110 on a timeline, and a timeline 155 for receiving a motion clip icon 130. In the shown embodiment, the timeline may separately have a voice clip, a motion clip, and a syllable indicating part, some or all of which may be integrated into one part or two parts.

First, the user may retrieve or extract a voice clip from the voice clip database by clicking a voice clip selection button 141 with a mouse. For example, when the voice clip selection button 141 is clicked, a voice clip UI window 143 is activated. When a keyword is input to a keyword input field of the voice clip UI window 143, the details and attributes of related voice clips are provided as a list. An output list may be displayed in the voice clip UI window 143 or another window, for example, an output window 123. For example, the list may include a text regarding the details of the voice clip and attribute information such as whether a speaker is female or male and whether the voice is bright or polite, etc. As another example, when an avatar is determined, the user may predefine certain properties in search limit fields of the voice clip UI window 143 and may search for only lists having the attributes.

When the user selects a specific voice clip from the list, the corresponding voice clip may be extracted, and the voice clip icon of the voice clip may appear in the default position of the timeline 151, for example, in a unit time zone directly subsequent to the last entered voice clip icon. The user may move the voice clip icon 110 to a position of his/her desired appropriate time point on the timeline 151 by dragging the voice clip icon 110 with a mouse.

According to an aspect of the proposed invention, when a voice clip is selected, the multimedia authoring apparatus determines information regarding syllables included in the voice clip and playback time points of the syllables and displays the syllable indication icons 110-1, . . . , 110-5 indicating pronunciation information of the syllables on the timeline 155.

Subsequently, the user determines an appropriate playback time point of a motion clip from the displayed syllable indication icons 110-1, . . . , 110-5 and edits the motion clip. The user may retrieve or extract a motion clip from the motion clip database by clicking a motion clip selection button 161 with a mouse. For example, when the motion clip selection button 161 is clicked, a motion clip UI window 163 is activated. When a keyword is input to a keyword input field of the motion clip UI window 163, the details and attributes of related motion clips are provided as a list. An output list may be displayed in the motion clip UI window 163 or another window, for example, the output window 123. For example, the list may include a text representing the operation of the motion clip and attribute information such as the feeling of the operation, for example, a rough operation, an active operation, a quiet operation, and the like. As another example, when an avatar is determined, the user may predefine certain properties in search limit fields of the motion clip UI window 163 and may search for only lists having the attributes.

When the user selects a specific motion clip from the list, the corresponding motion clip may be extracted, and the motion clip icon of the motion clip may appear in the default position of the timeline 155, for example, in a unit time zone directly subsequent to the last entered motion clip icon. The user may move the motion clip icon 130 to a position of his/her desired appropriate time point on the timeline 155 by dragging the motion clip icon 130 with a mouse.

As shown, the voice clip icon 110 may include information representing voice included in a related voice clip, for example, a text. In addition, the attribute of the corresponding voice clip may be represented in a colorful form or in a graphic form. When a plurality of voice clip icons, a plurality of motion clip icons, and a plurality of syllable indication icons are disposed on the same timeline at the same time, it is necessary to clearly distinguish the shapes of the icons as shown.

As shown, the motion clip icon 130 may have operation section display parts 131, 133, and 135 representing operation sections of the corresponding motion clip icon. For example, the operation section display part 131 may represent a section of bending over, the operation section display part 133 may represent a section of stopping while bent over, and the operation section display part 135 may represent a section of standing back up. The operation section display parts may include additional information or attribute information. For example, the acceleration of the operation may be represented in color, or the stop operation may be represented in a specific form.

In FIG. 1, the playback of a voice "how do you do" in the voice clip is displayed as being completed before the operation of bending over in the motion clip is finished. Some users may think that it is more polite and natural for the playback to be completed at a certain section of stopping while bent over. In this case, for example, the user may extend the pronunciation as shown in FIG. 2 by selecting and modifying the last syllable indication icon 110-5 with a mouse.

Figure 3:
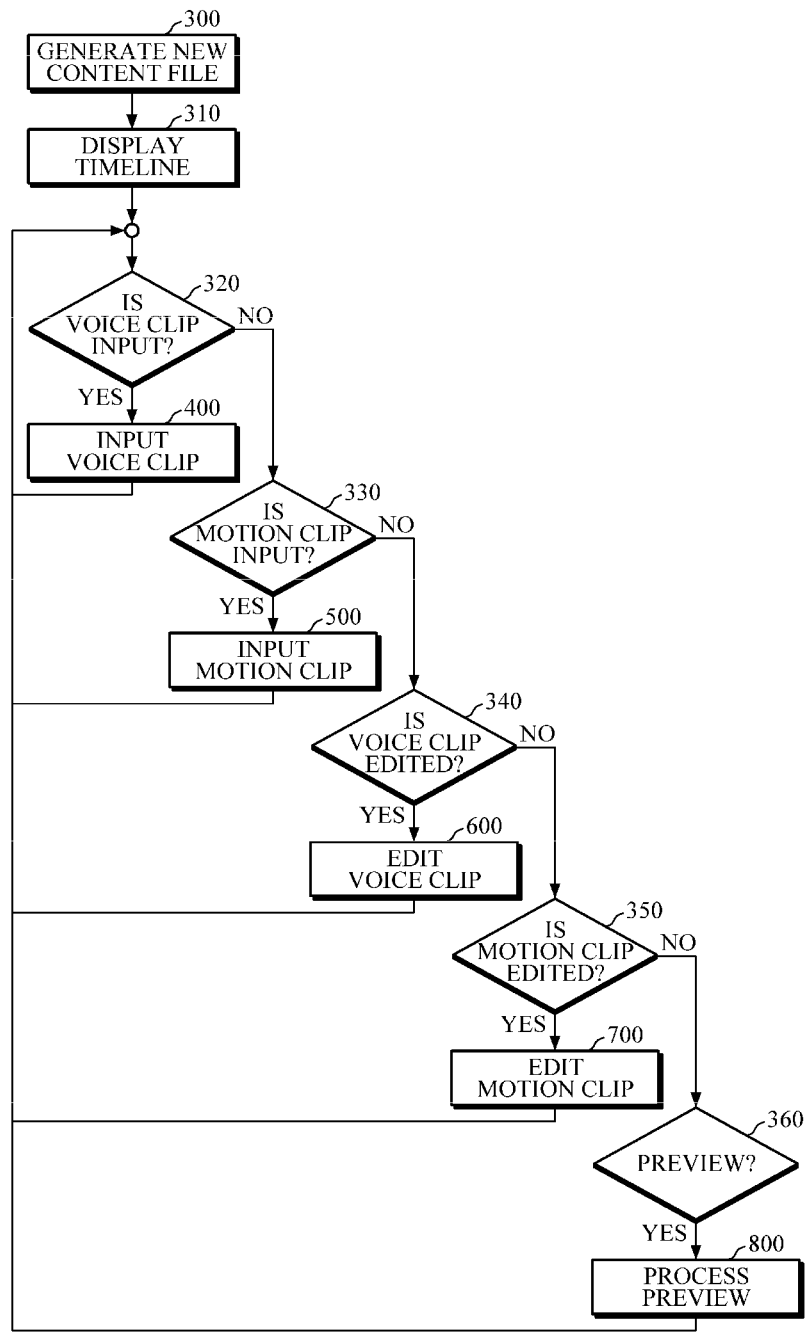
FIG. 3 is a flowchart illustrating a multimedia authoring method according to an embodiment.

FIG. 3 is a flowchart illustrating a multimedia authoring method according to an embodiment. In the illustrated embodiment, the multimedia authoring method may be implemented with program code executable by a computer. The computer may be a general computer including one or more microprocessors, a memory, an auxiliary storage, peripheral devices such as a network interface, input devices such as a mouse or a keyboard, and output devices such as a display. The motion clip database or the voice clip database may be stored in an external server, a network storage, or a local storage.

As shown, the multimedia authoring method according to an embodiment may include a timeline display operation 310 and a voice clip input operation 400. Additionally, an operation 300 of generating a new content file may be processed first. A user enters a file name of the new content file, and the computer generates a content file having the fine name and stores the generated content file. In the timeline display operation 310, a timeline as shown in FIG. 1 may be output to a screen. After the timeline is output, the computer checks whether the user has selected a voice clip input menu in operation 320. When the voice clip input menu is selected, the voice clip input operation 400 is executed.

Figure 4:
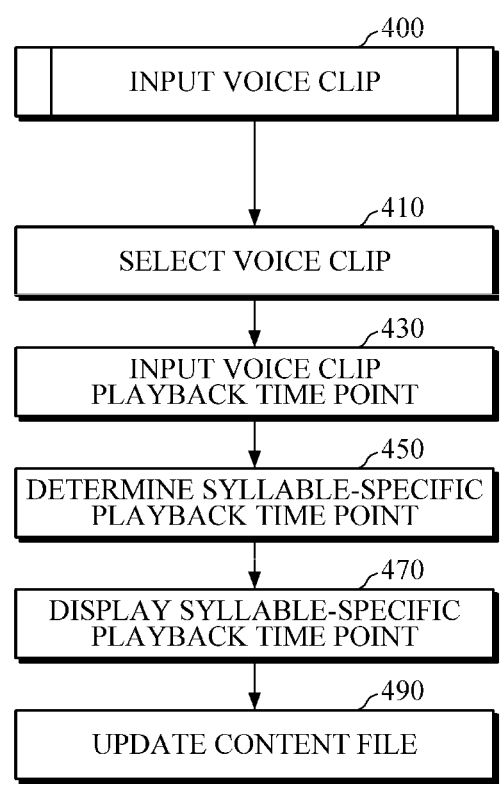
FIG. 4 is a flowchart illustrating a voice clip input operation of FIG. 3 according to an embodiment.

FIG. 4 is a flowchart illustrating the voice clip input operation 400 according to an embodiment. According to an aspect, the voice clip input operation 400 may include a voice clip playback time point input operation 430, a syllable-specific playback time point determination operation 450, and a syllable-specific playback time point display operation 470.

First, a voice clip is provided. To this end, the voice clip input operation 400 may further include a voice clip selection operation 410. In the voice clip selection operation 410, a voice clip may be selected according to the user's selection. For example, the user may select a voice clip from an output voice clip list. As still another example, the user may select a voice clip through a field search such as a keyword search. However, no voice clip is selected by the user, and a voice clip may be selected and input from the outside, for example, from another system or peripheral device through a microphone or a network.

In the voice clip playback time point input operation 430, the computer receives a playback start time point of the voice clip on the timeline through the input device from the user. For example, the computer may receive the playback start time point by detecting a position to which the user drags the voice clip icon on the timeline. Data representing an actual playback start time point from the position of the mouse, for example, a timestamp may be easily calculated by proportional computation. An icon indicating the selected voice clip may be displayed at a default position on the timeline, for example, at a unit time directly subsequent to the previously entered voice clip.

In the syllable-specific playback time point determination operation 450, the computer determines a playback time point of each syllable included in the voice clip on the timeline. In an embodiment, the syllables included in the voice clip or information regarding the playback time points of the syllables may be pre-provided as metadata and stored in the voice clip database in association with the voice clip. The information regarding the playback time points of the syllables stored in association with the voice clip are relative playback time point values in the corresponding voice clip. Thus, when the playback start time point value of the voice clip is added to the relative playback time point values, it is possible to find the playback time point values of the syllables in the entire content.

According to another aspect, a syllable-specific playback time point may be directly detected from a voice signal of the voice clip. According to this aspect, for example, the syllable-specific playback time point may be determined through voice recognition on the voice clip. Here, voice recognition processing includes text data, which is the details of the voice clip, and syllable-specific playback time points, which are the boundaries of the syllables. As another example, the voice clip database may store the text data, which is the details of the voice clip, as voice clip-specific metadata, and the voice recognition processing may detect only the syllable-specific playback time points, which are the boundaries of the syllables, from the frequency characteristics of the voice clip.

In the syllable-specific playback time point display operation 470, the computer displays syllable indication icons that indicate pronunciation information of the syllables at the syllable playback time points on the timeline. The display locations of the syllable indication icons on the timeline may be easily calculated by proportional computation according to a timeline length for the entire content playback time of the playback time point values.

According to an additional aspect, the multimedia authoring method may further include a content file update operation 490. In the embodiment shown in FIG. 3, a content file is generated first and then is updated when new objects are edited. In still another embodiment, the content file may be generated after the editing of all the objects is complete and then may be stored or updated at one time. When the input of the voice clip is completed, the content file is updated (operation 490). Following the last voice clip stored in the content file, a newly edited voice clip is additionally included and stored with a playback time determined according to an editing position on the timeline.

Referring back to FIG. 3, when the voice clip input is not selected in operation 320, whether a motion clip input is selected is checked (operation 330). When the motion clip input is selected, the motion clip input is processed (operation 500). Although not shown, when the motion clip input is selected, whether a voice clip on which synchronization authoring is to be performed has been input is checked. When no voice clip has been input, an error may be output.

Figure 5:
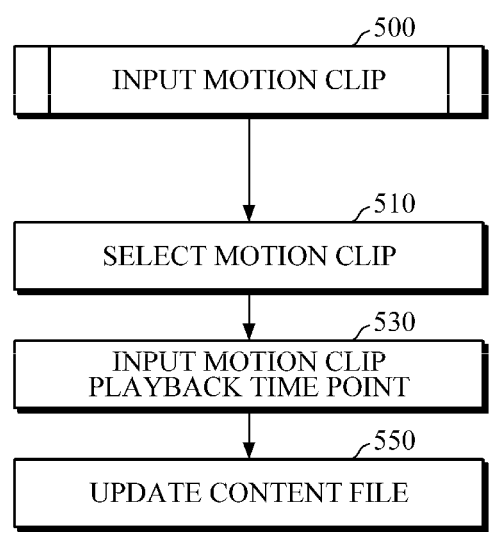
FIG. 5 is a flowchart illustrating a motion clip input operation according to an embodiment.

FIG. 5 is a flowchart illustrating the motion clip input operation according to an embodiment. First, a motion clip is provided. To this end, the motion clip input operation 500 may further include a motion clip selection operation 510. In the motion clip selection operation 510, a motion clip may be selected according to the user's selection. For example, the user may select a motion clip from an output motion clip list. As another example, the user may select a motion clip through a field search such as a keyword search. However, no motion clip is selected by the user, and a motion clip may be selected and entered from the outside, for example, from another system or peripheral device through a network. An icon indicating the selected motion clip may be displayed at a default position on the timeline, for example, at a unit time directly subsequent to the previously entered motion clip.

Although not shown, when the motion clip input is selected, whether a voice clip on which synchronization authoring is to be performed has been input is checked. When no voice clip has been input, an error may be output.

In a motion clip playback time point input operation 530, a computer receives a playback start time point of the motion clip on the timeline through an input device from a user. For example, the computer may receive the playback start time point by detecting a position to which the user drags the motion clip icon placed at the default position on the timeline. Data representing an actual playback start time point from the position of the mouse, for example, a timestamp may be easily calculated by proportional computation. When the user does not move the motion clip icon placed at the default position, the current default position is input as the playback start time point.

According to an additional aspect, the multimedia authoring method may further include a content file update operation 550. When the input of the motion clip is completed, the content file is updated (operation 550). Following the last motion clip stored in the content file, a newly edited motion clip is additionally included and stored. The playback time point of the voice clip and the playback time point of the motion clip are synchronized according to the display position on the timeline. For example, the timestamp of the additionally included motion clip is set to correspond to a timestamp representing a playback time point of the corresponding clip or syllable or is set as a value calculated based on values adjacent to the timestamp.

According to another aspect, the proposed multimedia authoring method may support the editing of the input voice clip. Referring back to FIG. 3, when the user selects a voice clip editing (operation 340), the voice clip editing is processed (operation 600). The user may select the replacement of one of a plurality of voice clips that have been input (operation 610). For example, the user may select a voice clip with a mouse and click the right button of the mouse to select a voice clip replacement from among listed menus.

Subsequently, a voice clip to be substituted is selected (operation 611). The selection of the voice clip to be substituted may be achieved, for example, similarly to operation 410 of FIG. 4. Subsequently, a playback time point of each syllable included in the substituted voice clip on the timeline is determined. The determination of the playback time point may be achieved, for example, similarly to operation 450 of FIG. 4. The determined playback time point of the corresponding syllable is displayed on the timeline as a syllable indication icon (operation 615). Subsequently, the content file is updated in consideration of edited details (operation 617). The update of the content file may be achieved, for example, similarly to operation 490 of FIG. 4.

When the replacement of the voice clip is not selected in operation 610, whether the movement of the voice clip has been selected is checked (operation 630). For example, the user may select and drag the voice clip with the mouse to instruct the movement of the voice clip (operation 630). In an embodiment, when the voice clip is dragged on the timeline, a position to which the voice clip is dragged is received as a new playback time point of the voice clip (operation 631). Data representing an actual playback start time point of the voice clip from the input position on the timeline, for example, a timestamp may be easily calculated by proportional computation. Subsequently, a playback time point of each syllable included in the voice clip on the timeline is determined according to a new playback time point of the voice clip (operation 633). The determination of the playback time point may be achieved, for example, similarly to operation 450 of FIG. 4. The determined playback time point of the corresponding syllable is displayed on the timeline as a syllable indication icon (operation 635). Subsequently, the content file is updated in consideration of edited details (operation 637). The update of the content file may be achieved, for example, similarly to operation 490 of FIG. 4.

When the movement of the voice clip is not selected in operation 630, whether syllable alteration has been selected is checked (operation 650). For example, the user may select and modify the syllable indication icon with the mouse to instruct the alteration of the corresponding syllable (operation 650). According to an aspect, the movement of a target syllable indication icon by the user may be detected in the range of adjacent syllable indication icons on the timeline. As an example, the movement of the syllable indication icon may be achieved, for example, by moving any one of an icon indicating the start of the pronunciation of the syllable and an icon indicating the end of the pronunciation of the syllable. As another example, the movement of the syllable indication icon may be achieved by modifying the syllable indication icon such that an area occupied on the timeline is widened or narrowed. In an embodiment, the time interval of the syllable alteration is input based on the size of the area occupied by the syllable indication icon on the timeline (operation 651). Subsequently, a syllable signal is altered according to the time interval. For example, the playback time may be extended by copying a voice signal of the same syllable pronunciation and connecting to the copied voice signal to an existing voice signal. On the contrary, by cutting out a part of the rear end of the voice signal of the syllable pronunciation, it is possible to reduce the playback time. Subsequently, the content file is updated in consideration of the edited details (operation 637).

Referring back to FIG. 3, when the editing of the voice clip is not selected (operation 340), whether the editing of the motion clip has been selected is checked (operation 350). The editing of the motion clip may include the replacement or movement of the motion clip that has already been present. In an embodiment, the replacement of the motion clip may be processed by selecting a motion clip for the replacement, inserting the selected motion clip into a corresponding playback time point position in place of the motion clip that has already been present, and updating the content file. In an embodiment, the movement of the motion clip may be processed by determining a new playback time point of the motion clip from a position to which the motion clip icon is dragged when the user drags the motion clip icon with the mouse and then by reflecting the determination in the content file.

When the editing of the motion clip is not selected in operation 340, whether a preview has been selected is checked (operation 360). The selection of the preview may be instructed, for example, by selecting a preview button 121 shown in FIG. 1 with the mouse. When the preview is selected, two buttons indicating a start time point and an end time point are displayed so that a time interval for the preview is selected on the timeline. The user may drag and move the two buttons with the mouse to enter an interval for the preview. Subsequently, for example, when the user pushes a playback button disposed in the preview window 123 to instruct the playback, a multimedia player may be called. A voice clip and a motion clip of the corresponding interval may be supplied together with metadata controlling the playback, played back during the interval, and output to the preview window.

Figure 7:
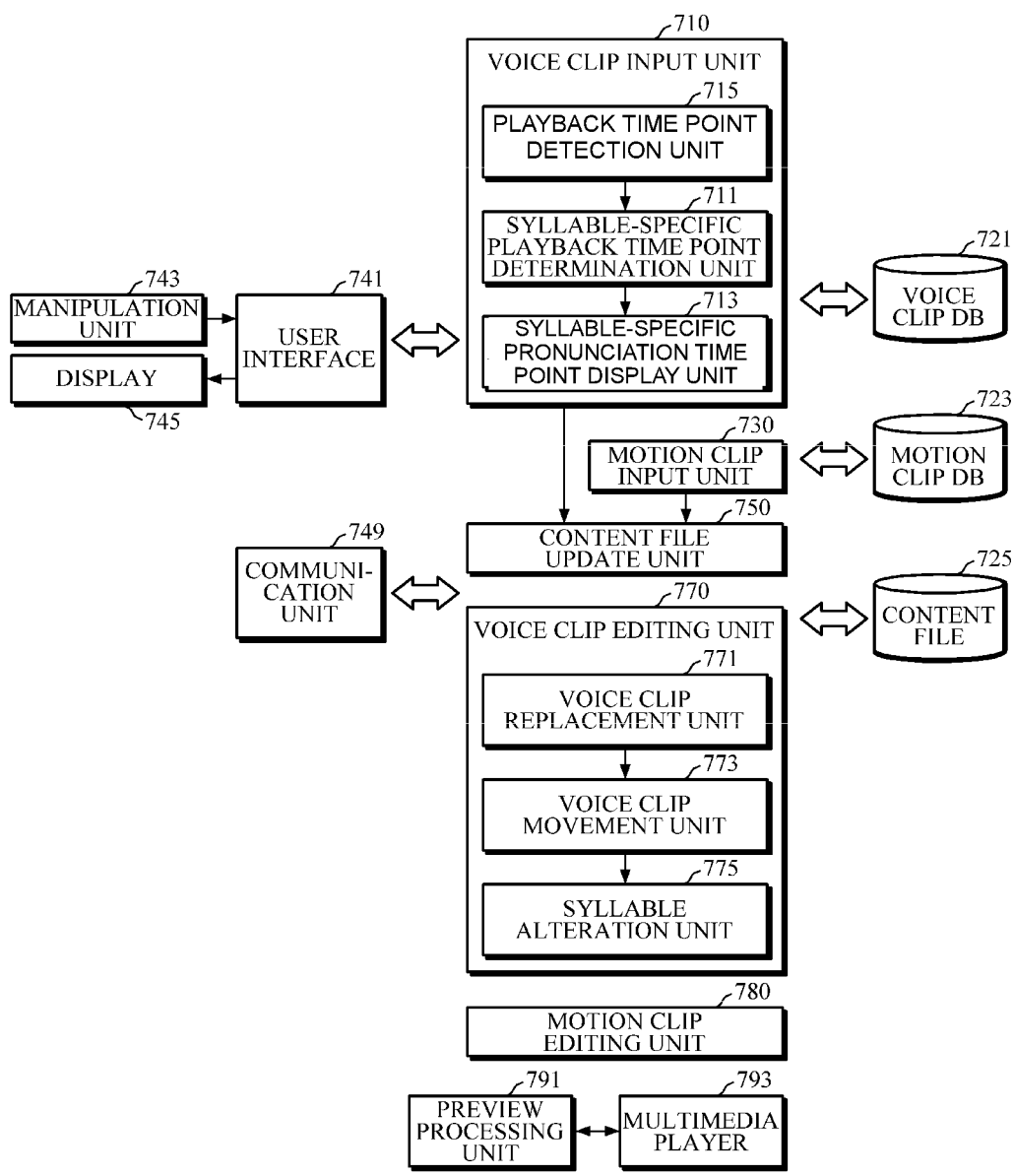
FIG. 7 is a block diagram showing a configuration of a multimedia authoring apparatus according to an embodiment.

FIG. 7 is a block diagram showing a configuration of a multimedia authoring apparatus according to an embodiment. In the shown embodiment, the multimedia authoring apparatus according to an embodiment includes a computer including a microprocessor, a memory, an auxiliary memory device, and an Ethernet communication modem and peripheral devices, for example, a mouse, a keyboard, and a liquid crystal monitor and is implemented with an operating system and an application program stored in the memory.

A voice clip input unit 710, a motion clip input unit 730, a voice clip editing unit 770, a motion clip editing unit 780, and a preview processing unit 791 are implemented with a set of computer program instructions executed on the microprocessor. A manipulation unit 743 represents hardware such as a mouse and a keyboard and corresponding driver programs, a display 745 represents hardware such as a liquid crystal monitor and its driver programs, and a communication unit 749 represents hardware such as an Ethernet modem and corresponding driver programs. Some or all of a variety of databases 721, 723, and 725 may be stored in the auxiliary memory device or in a storage connected to a network or may separately reside in a server connected to a network.

As shown, the multimedia authoring apparatus according to an embodiment includes a voice clip database 721 and a voice clip input unit 710. The voice clip input unit 710 adds the voice clip selected by the user through a user interface 741 to the content file. In an embodiment, the voice clip input unit 710 includes a syllable-specific playback time point determination unit 711 and a syllable-specific pronunciation time point display unit 713.

In an embodiment, a voice clip and text information which is the details of the voice clip are stored in association with each other in the voice clip database 721. The syllable-specific playback time point determination unit 711 determines a playback time point of each syllable included in the voice clip on the timeline from the playback start time point of the voice clip input on the timeline. The user enters the playback time point of the voice clip by selecting the voice clip through the user interface 741 and dragging the voice clip on the timeline. The syllable-specific pronunciation time point display unit 713 displays a syllable indication icon that indicates pronunciation information of the corresponding syllable at the playback time point of each syllable on the timeline. These operations may correspond to the voice clip selection operation 410, the voice clip playback time point input operation 430, the syllable-specific playback time point determination operation 450, and the syllable-specific playback time point display operation 470, and thus a detailed description thereof will be omitted.

According to an additional aspect, the voice clip input unit 710 may further include a playback time point detection unit 715. The playback time point detection unit 715 outputs, to the syllable-specific playback time point determination unit 711, the playback time points of the syllables determined through voice recognition on the voice clip. Here, voice recognition processing includes text data, which is the details of the voice clip, and syllable-specific playback time points, which are the boundaries of the syllables. As another example, the voice clip database may store the text data, which is the details of the voice clip, as voice clip-specific metadata, and the voice recognition processing may detect only the syllable-specific playback time points, which are the boundaries of the syllables, from the frequency characteristics of the voice clip.

According to an additional aspect, the multimedia authoring apparatus may further include a motion clip input unit 730. The motion clip input unit 730 receives a playback start time point of the motion clip on the timeline and displays a motion clip icon. The operation of the motion clip input unit 730 corresponds to that described in detail with reference to FIG. 5, and thus a detailed description thereof will be omitted.

According to an additional aspect, the multimedia authoring apparatus may further include a content file update unit 750. The content file update unit 750 adds the voice clip and the motion clip to existing voice clip data and motion clip data of a content file, respectively. Also, the content file update unit 750 synchronizes and stores the playback time points of the added voice clip and motion clip according to the display positions on the timeline. In an embodiment, for example, data stored in the content file may have a form in which a voice clip and a timestamp indicating a playback time point of the voice clip are sequentially stored and in which a motion clip and a timestamp indicating a playback time point of the motion clip are sequentially stored. In this case, the addition of a new voice clip or motion clip is achieved just by adding new data to existing data. The change of an existing voice clip or motion clip may cause the entire change of the timestamps of subsequent voice clips or motion clips due to the changed voice clip or motion clip.

Figure 6:
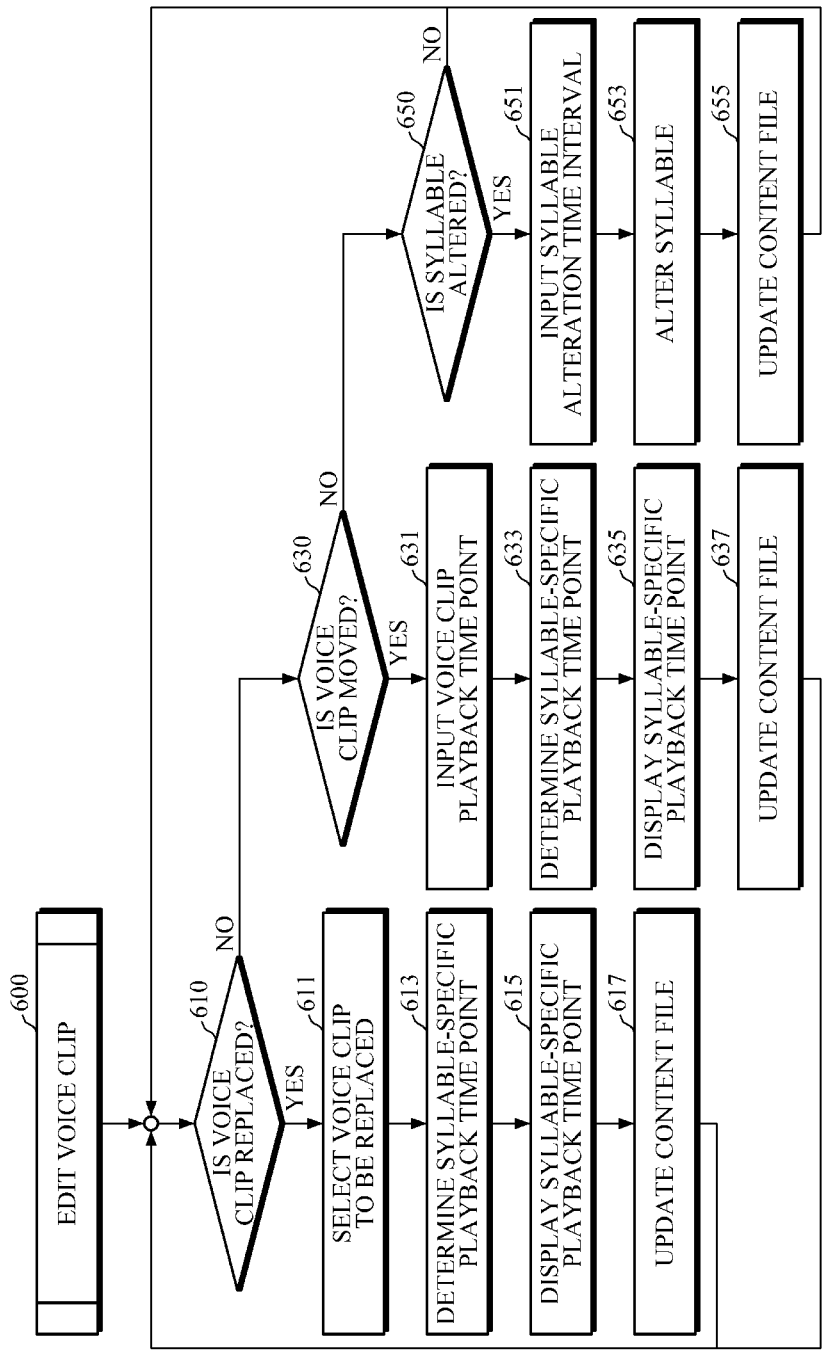
FIG. 6 is a flowchart illustrating a voice clip editing operation of FIG. 3 according to an embodiment.

According to an additional aspect, the multimedia authoring apparatus may further include a voice clip editing unit 770. The voice clip editing unit 770 may include a voice clip replacement unit 771 and a voice clip movement unit 773. In addition, the voice clip editing unit 770 may further include a syllable alteration unit 775. The syllable alteration unit 775 detects that the user moves a target syllable indication icon through a user interface in the range of adjacent syllable indication icons on the timeline. The syllable alteration unit 775 alters the corresponding voice clip so that the pronunciation of the corresponding syllable may be lengthened or shortened depending on a displacement of the movement. The specific operations of the voice clip replacement unit 771, the voice clip movement unit 773, and the syllable alteration unit 775 correspond to those described with reference to FIG. 6, and thus a detailed description thereof will be omitted.

According to an additional aspect, the multimedia authoring apparatus may further include a motion clip editing unit 780. According to an additional aspect, the multimedia authoring apparatus may further include a preview processing unit 791 and a multimedia player 793. The operations of the preview processing unit 791 and the multimedia player 793 correspond to the motion clip editing operation 700 and the preview processing operation 800 of FIG. 3, and thus a detailed description thereof will be omitted.

According to the proposed invention, it is possible to edit motion in synchronization with a syllable of a voice clip. By dragging a motion clip icon on a timeline, it is possible to synchronize a motion clip with a voice clip at the most appropriate time point intended by an author. Furthermore, by dragging an icon indicating a syllable of a voice clip, the playback of voice may be altered in consideration of motion, and thus it is possible to achieve directing of natural synchronization.

The present invention has been described above with reference to the embodiments referring to the accompanying drawings, but is not limited thereto. Rather, the present invention should be construed as encompassing various modifications that may be apparent to those skilled in the art. The appended claims are intended to cover such modifications.

What is claimed is:

1. A multimedia authoring method that is executable on a computer configured to author multimedia content in response to an instruction from a user, the multimedia authoring method comprising:
   a timeline display operation for displaying a timeline;
   a voice clip playback time point input operation for receiving a playback start time point of a voice clip on the timeline;
   a syllable-specific playback time point determination operation for determining playback time points of syllables included in the voice clip on the timeline;
   a syllable-specific pronunciation time point display operation for displaying syllable indication icons indicating pronunciation information of the syllables at the playback time points of the syllables on the timeline;
   an operation for detecting that the user moves a target syllable indication icon in the range of adjacent syllable indication icons on the timeline; and
   a voice clip alteration operation for altering the corresponding voice clip so that a corresponding syllable has a pronunciation lengthened or shortened depending on a displacement of the movement.

2. The multimedia authoring method of claim 1, wherein the syllable-specific playback time point determination operation comprises determining the playback time points of the syllables through voice recognition on the voice clip.

3. The multimedia authoring method of claim 1, wherein the syllable-specific playback time point determination operation comprises determining the playback time points of the syllables on the basis of metadata stored in association with the voice clip.

4. The multimedia authoring method of claim 1, further comprising a motion clip input operation for receiving a playback start time point of a motion clip on the timeline and displaying a motion clip icon.

5. The multimedia authoring method of claim 4, further comprising a content file update operation for adding the voice clip and the motion clip to existing voice clip data and motion clip data of a content file, respectively, and synchronizing playback time points of the added voice clip and motion clip depending on a display position on the timeline.

6. A multimedia authoring apparatus comprising:
   a voice clip database; and
   a voice clip input unit comprising:
   a syllable-specific playback time point determination unit configured to determine playback time points of syllables included in a voice clip input on a timeline from a playback start time point of the voice clip on the timeline;

a syllable-specific pronunciation time point display unit configured to display a syllable indication icon indicating pronunciation information of each of the syllables at the playback time point of the corresponding syllable on the timeline; and a voice clip alteration unit configured to detect that a user moves a target syllable indication icon in the range of adjacent syllable indication icons on the timeline and configured to alter the corresponding voice clip so that a corresponding syllable has a pronunciation lengthened or shortened depending on a displacement of the movement.

7. The multimedia authoring apparatus of claim 6, wherein the voice clip input unit further comprises a playback time point detection unit configured to output, to the syllable-specific playback time point determination unit, the playback time points of the syllables determined through voice recognition on the voice clip.

8. The multimedia authoring apparatus of claim 6, further comprising a pronunciation information generation unit configured to perform voice recognition processing on voice clips, determine a specific playback time point for each voice clip, and store the specific playback time point in a voice clip database in association with the corresponding voice clip.

9. The multimedia authoring apparatus of claim 6, further comprising a motion clip input unit configured to receive a playback start time point of a motion clip on the timeline and display a motion clip icon.

10. The multimedia authoring apparatus of claim 9, further comprising a content file update unit configured to add the voice clip and the motion clip to existing voice clip data and motion clip data of a content file, respectively, and synchronize playback time points of the added voice clip and motion clip depending on a display position on the timeline.

* * * * *